United States Patent
Osakabe

(10) Patent No.: US 10,839,273 B2
(45) Date of Patent: Nov. 17, 2020

(54) APPLICATOR DEVICE INCLUDING A CAMERA AND A PRINT HEAD WHICH IS MOVABLE BETWEEN A POSITION THAT BLOCKS THE CAMERA AND A POSITION THAT DOES NOT BLOCK THE CAMERA, APPLICATOR SYSTEM, APPLICATION METHOD, AND NON-TRANSITORY RECORDING MEDIUM

(71) Applicant: CASIO COMPUTER CO., LTD., Tokyo (JP)

(72) Inventor: Fumihiro Osakabe, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/588,020

(22) Filed: Sep. 30, 2019

(65) Prior Publication Data
US 2020/0110973 A1    Apr. 9, 2020

(30) Foreign Application Priority Data

Oct. 3, 2018  (JP) .................................. 2018-188094

(51) Int. Cl.
*G06F 15/00*    (2006.01)
*G06F 3/12*    (2006.01)
(Continued)

(52) U.S. Cl.
CPC ....... *G06K 15/1825* (2013.01); *G06K 15/102* (2013.01); *G06K 15/186* (2013.01); *H04N 5/2252* (2013.01); *H04B 1/3827* (2013.01)

(58) Field of Classification Search
CPC ............. G06K 15/1825; G06K 15/102; G06K 15/186; H04N 5/2252; H04B 1/3827
(Continued)

(56) References Cited

U.S. PATENT DOCUMENTS

| | | | |
|---|---|---|---|
| 9,156,282 B2 | 10/2015 | Yamasaki | |
| 2015/0225104 A1* | 8/2015 | Reed | ........................ B65C 1/028 347/110 |
| 2016/0052314 A1* | 2/2016 | Van Den Heuvel | ........................ B41J 2/16538 347/14 |

FOREIGN PATENT DOCUMENTS

| | | |
|---|---|---|
| CN | 104042025 A | 9/2014 |
| JP | H1035034 A | 2/1998 |

(Continued)

OTHER PUBLICATIONS

Chinese Office Action (and English language translation thereof) dated Sep. 2, 2020 issued in counterpart Chinese Application No. 201910915369.8.

*Primary Examiner* — Douglas Q Tran
(74) *Attorney, Agent, or Firm* — Holtz, Holtz & Volek PC

(57) ABSTRACT

An applicator device includes a camera, a print head, and a driver. The camera captures an image of an application surface of an application target. The print head applies a material to the application surface. The driver causes the print head to move between a first position where the print head does not block a field of view of the capturing, by the camera, of the image of the application surface and a second position where the print head blocks the field of view of the capturing, by the camera, of the image of the application surface. The print head applies the material to the application surface when the print head is at the second position, based on the image of the application surface captured by the camera when the print head is at the first position.

17 Claims, 10 Drawing Sheets

(51) Int. Cl.
    *G06K 1/00*           (2006.01)
    *G06K 15/02*         (2006.01)
    *G06K 15/10*         (2006.01)
    *H04N 5/225*        (2006.01)
    *H04B 1/3827*      (2015.01)

(58) Field of Classification Search
    USPC .......................................... 358/1.5, 1.1, 1.13
    See application file for complete search history.

(56) References Cited

FOREIGN PATENT DOCUMENTS

| | | |
|---|---|---|
| WO | 2013145268 A1 | 10/2013 |
| WO | 2014049829 A1 | 4/2014 |

\* cited by examiner

APPLICATOR DEVICE INCLUDING A CAMERA AND A PRINT HEAD WHICH IS MOVABLE BETWEEN A POSITION THAT BLOCKS THE CAMERA AND A POSITION THAT DOES NOT BLOCK THE CAMERA, APPLICATOR SYSTEM, APPLICATION METHOD, AND NON-TRANSITORY RECORDING MEDIUM

CROSS-REFERENCE TO RELATED APPLICATION

This application claims the benefit of Japanese Patent Application No. 2018-188094, filed on Oct. 3, 2018, the entire disclosure of which is incorporated by reference herein.

FIELD

This application relates generally to an applicator device, an applicator system, an application method, and a non-transitory recording medium.

BACKGROUND

Devices capable of applying a material to an application target are known. Such devices are held by a user and moved to a desired position above the application target. For example, Unexamined Japanese Patent Application Kokai Publication No. H10-35034 describes a manual printing device that prints on a recording medium by being manually scanned above the recording medium. Specifically, the printing device described in Unexamined Japanese Patent Application Kokai Publication No. H10-35034 prints by spraying, in accordance with the amount of movement of the device, ink from a print head onto the recording medium when the device is manually scanned above the recording medium by the user.

SUMMARY

According to one aspect of the present disclosure, an applicator device includes a camera, a print head, and a driver. The camera captures an image of an application surface of an application target. The print head applies a material to the application surface. The driver causes the print head to move between a first position where the print head does not block a field of view of the capturing, by the camera, of the image of the application surface and a second position where the print head blocks the field of view of the capturing, by the camera, of the image of the application surface. The print head applies the material to the application surface when the print head is at the second position, based on the image of the application surface captured by the camera when the print head is at the first position.

BRIEF DESCRIPTION OF THE DRAWINGS

A more complete understanding of this application can be obtained when the following detailed description is considered in conjunction with the following drawings, in which.

DETAILED DESCRIPTION

Figure 1:
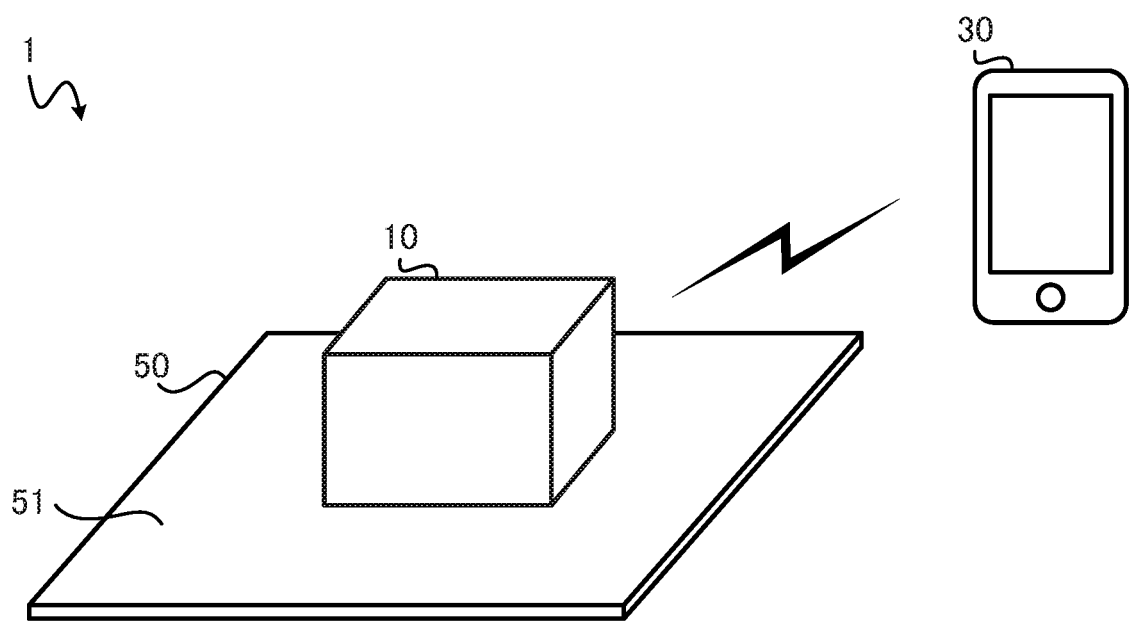
FIG. 1 is a drawing illustrating an overview of an applicator system according to an embodiment of the present disclosure.

Hereinafter, embodiments of the present disclosure are described while referencing the drawings. Note that, in the drawings, identical or corresponding components are marked with the same reference numerals.

FIG. 1 illustrates the overall configuration of an applicator system 1 according to an embodiment of the present disclosure. As illustrated in FIG. 1, the applicator system 1 includes an applicator device 10 and a terminal device 30. The applicator device 10 and the terminal device 30 are communicatively connected to each other via wireless or wired communication.

The applicator device 10 is a device which, by applying a material (ink) on an application target 50, is capable of forming characters, symbols, shapes, designs, patterns, and the like on a surface of the application target 50. The applicator device 10 is also called a "handy printer" and is used by a user holding the entire device and setting the device at a position, above the application target 50, where a user desires to apply the ink.

The application target 50 is an object to which ink is to be applied by the applicator device 10. In one example, the application target 50 is a paper medium such as printing paper or cardboard. However, the application target 50 is not limited to objects made from paper and may be plastic, metal, wood, or the like, a textile such as fabric or leather, or may be the skin of a human, an animal, or the like. Thus, the application target 50 may be made from any material, provided that the ink can adhere to the material. The applicator device 10 is usable in various applications including, for example, printing characters, symbols, shapes, and the like on printing paper or the like, correcting mistakes by applying ink over mistakes drawn on printing paper or the like, and applying ink over dirt, stains, or the like on skin or the like to make the dirt, stains, or the like less conspicuous.

The surface of the application target 50 on which the ink is to be applied, namely an application surface 51, is not limited to a flat surface, and may be a curved surface or an undulating surface. The ink is a material that is to be applied to the application target 50 in order to print the image to be printed. Note that the ink is not limited to being a liquid, and may be a solid or a gel. The ink may be a dye ink, a pigment ink, or the like and, provided that the ink can be applied, may be made from any material.

Figure 2:
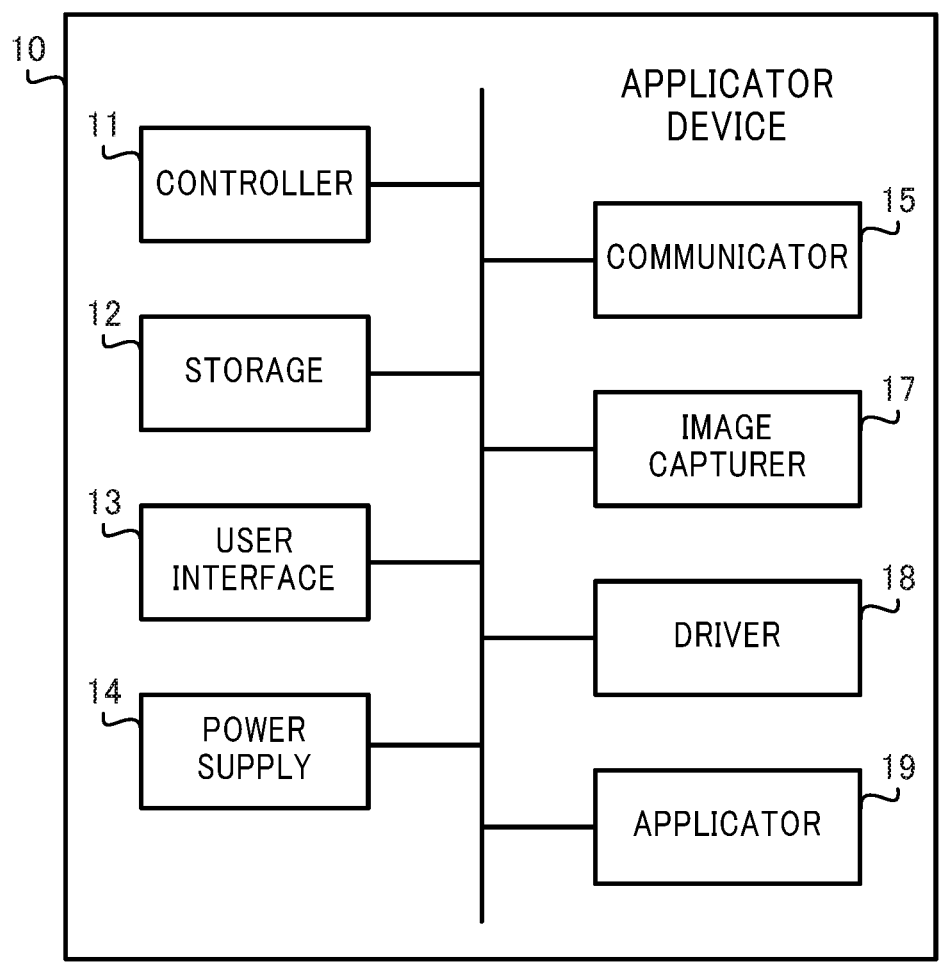
FIG. 2 is a block diagram illustrating the hardware configuration of an applicator device according to the embodiment of the present disclosure.

As illustrated in FIG. 2, the applicator device 10 includes a controller 11, a storage unit 12, a user interface 13, a power supply 14, a communicator 15, an image capturer 17, a driver 18, and an applicator 19.

The controller 11 includes a central processing unit (CPU), read only memory (ROM), and random access memory (RAM). In one example, the CPU is a microprocessor or the like and is a central processing unit that executes a variety of processing and computation. In the controller 11, the CPU is connected, via a system bus, to each component of the applicator device 10. Additionally, the CPU functions as control means that reads a control program stored in the ROM and controls the operations of the entire applicator device 10 while using the RAM as working memory. The controller 11 also includes a timer that keeps track of the current time, such as a real time clock (RTC).

The storage 12 is nonvolatile memory such as flash memory or a hard disk. The storage 12 stores programs and data used by the controller 11 to perform various processes. For example, the storage 12 stores display data and ink application data for displaying and applying characters, symbols, emoji, and the like, and tables that define the various settings in the ink application. Moreover, the storage 12 stores data generated or acquired as a result of the controller 11 performing the various processes.

The user interface 13 includes an input receiver such as an input key, a button, a switch, a touch pad, or a touch panel, and display devices such as a liquid crystal panel and a light emitting diode (LED). The user interface 13 receives various operation commands from the user via the input devices, and sends the received operation commands to the controller 11. Moreover, the user interface 13 acquires various information from the controller 11 and displays images that represent the acquired information on the display device.

The power supply 14 includes a battery and a voltage detector, and produces the power necessary for the operations of the applicator device 10, and supplies that power to the various components.

The communicator 15 includes an interface that enables the applicator device 10 to communicate with external devices. Examples of the external devices include personal computers, tablet terminals, smartphones, and other terminal devices. The communicator 15 communicates with the external devices via, for example, a universal serial bus (USB), a wireless local area network (LAN) such as wireless fidelity (Wi-Fi), Bluetooth (registered trademark), or the like. Under the control of the controller 11, the communicator 15 acquires, via such wired or wireless communication, a variety of data, including print data, from the external devices.

The image capturer 17 is a so-called camera, and includes a lens that collects light emitted from a subject, an image capturing element such as a charge coupled device (CCD) or a complementary metal oxide semiconductor (CMOS) that acquires an image of the subject by receiving the collected light, and an analog/digital (A/D) converter that converts the captured image sent from the image capturing element as an electronic signal to a digital signal. The image capturer 17 captures an image of the surface of the application target 50 when the applicator device 10 is set above the application target 50, and sends the captured image obtained by the capturing to the controller 11. The image capturer 17 functions as the image capturing means.

The driver 18 includes drive members such as a motor or an actuator for driving the applicator 19 within the applicator device 10, and drive circuits that drive these drive members. The drive circuits provide pulsed driving signals to the drive members in accordance with control signals sent from the controller 11. The driver 18 drives the drive members in accordance with the pulsed signals provided via the drive circuits, thereby causing the applicator 19 to move along slide rails. The driver 18 functions as the driver means.

The applicator 19 is an applicator mechanism that prints by applying ink to the surface of the application target 50. The applicator 19 uses an ink jet method to apply the ink to the surface of the application target 50. In this method, an ink cartridge is filled with ink and this ink is micronized and directly sprayed from an ink head onto the application target 50. The applicator 19 functions as the applicator means.

In one example, the applicator 19 discharges ink by a thermal method. Specifically, pluralities of nozzles are arranged on the ink head of the applicator 19 in the main scanning direction (X-direction) and the sub-scanning direction (Y-direction). The ink in the pluralities of nozzles is heated by a heater to produce air bubbles and the ink is discharged, by the air bubbles, from each of the plurality of nozzles toward (vertically downward) the application target 50. The applicator 19 applies ink to the surface of the application target 50 according to this principle.

Figure 3:
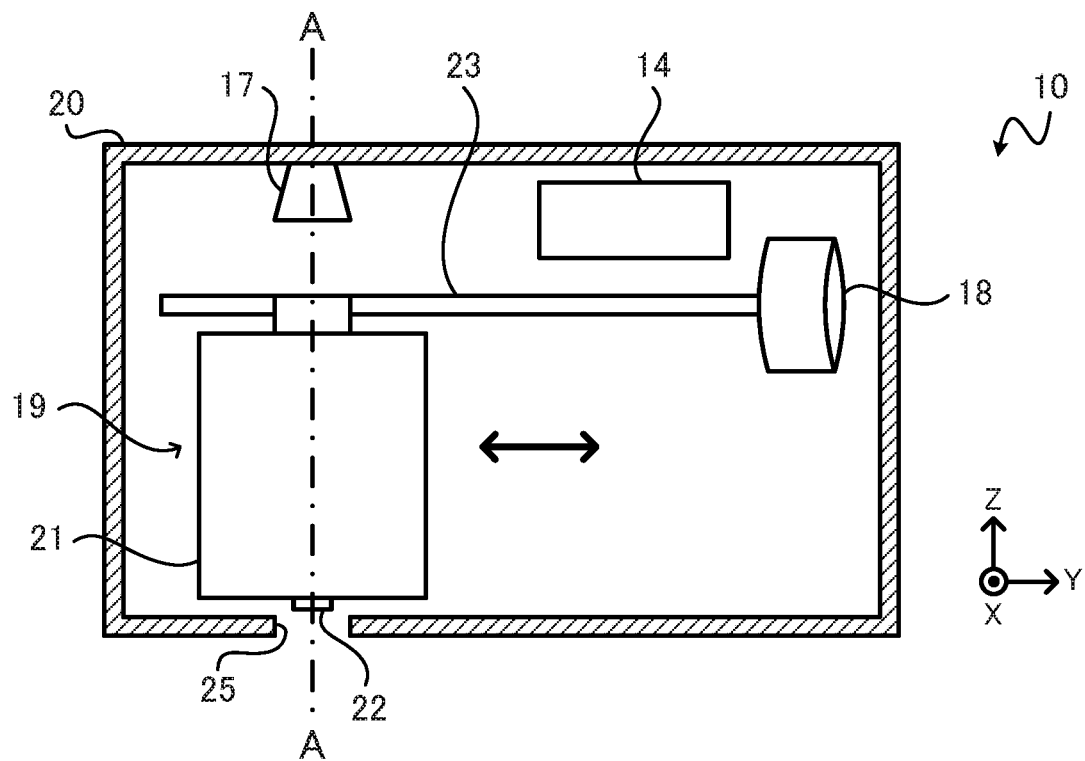
FIG. 3 is a cross-sectional view of the applicator device according to the embodiment of the present disclosure, viewed from a direction perpendicular to a movement direction of an applicator.
Figure 4:
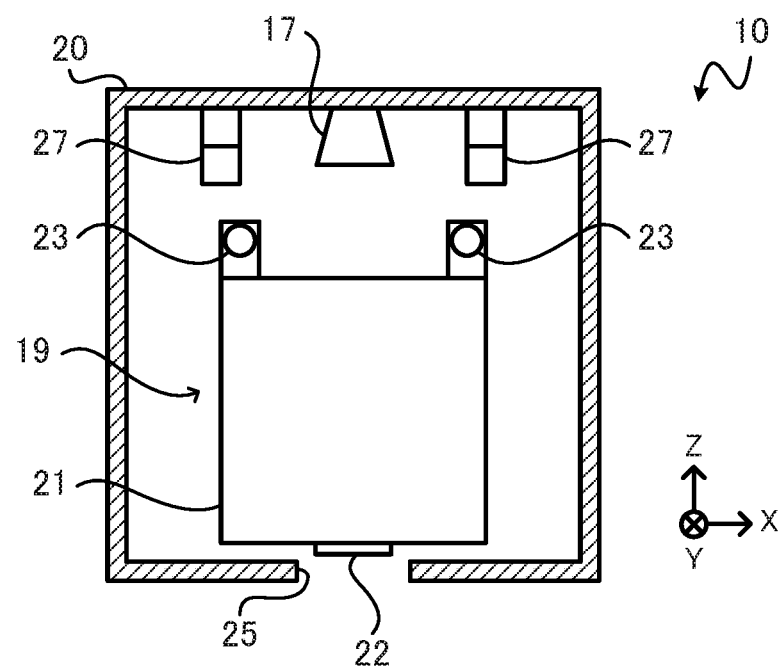
FIG. 4 is a cross-sectional view of the applicator device according to the embodiment of the present disclosure, viewed from a direction parallel to the movement direction of the applicator.

FIGS. 3 and 4 illustrate cross-sections of the applicator device 10. FIG. 3 illustrates a cross-section of the applicator device 10, viewed from the X-direction, and FIG. 4 illustrates a cross-section of the applicator device, taken along line A-A of FIG. 3, viewed from the Y-direction. As illustrated in FIGS. 3 and 4, the applicator device 10 includes a housing 20 and, within the housing 20, the power supply 14, the image capturer 17, the driver 18, the applicator 19, slide rails 23, and illuminators 27. The housing 20 is fabricated using a hard synthetic resin such as plastic, for example, as a main material.

In FIGS. 3 and 4, the X-direction corresponds to the lateral direction of the applicator device 10, the Y-direction corresponds to the longitudinal direction of the applicator device 10, and the Z-direction corresponds to the direction perpendicular to the application surface of the application target 50, that is, corresponds to the direction in which the ink is sprayed from the applicator 19. The X-direction, the Y-direction, and the Z-direction are orthogonal to one another. These definitions apply to the other drawings as well.

The applicator 19 includes an ink cartridge 21 and an ink head 22. The ink cartridge 21 stores the ink to be applied to the application target 50. The ink head 22 is mounted on a lower portion of the ink cartridge 21, and discharges the ink in the ink cartridge 21 through the nozzles. In a state in which the ink cartridge 21 is stored in a cartridge storing unit, the ink is applied to the surface of the application target 50 by discharging the ink in the ink cartridge 21 from the ink head 22. The user can freely change the ink to be applied to the application target 50 by replacing the ink cartridge 21 according to the desired color, material, and the like of the ink.

As illustrated in FIG. 3, the slide rails 23 are provided along the longitudinal direction (Y-direction) of the applicator device 10. As illustrated in FIG. 4, the slide rails 23 are provided as a pair that is arranged in the lateral direction (X-direction) of the applicator device 10. The slide rails 23 support both ends of the applicator 19. The applicator 19 is attached to the slide rails 23 via the cartridge storage, and is driven by the driver 18, thereby being moved back and forth in the Y-direction (the direction indicated by the arrow in FIG. 3) along the slide rails 23.

Figure 5:
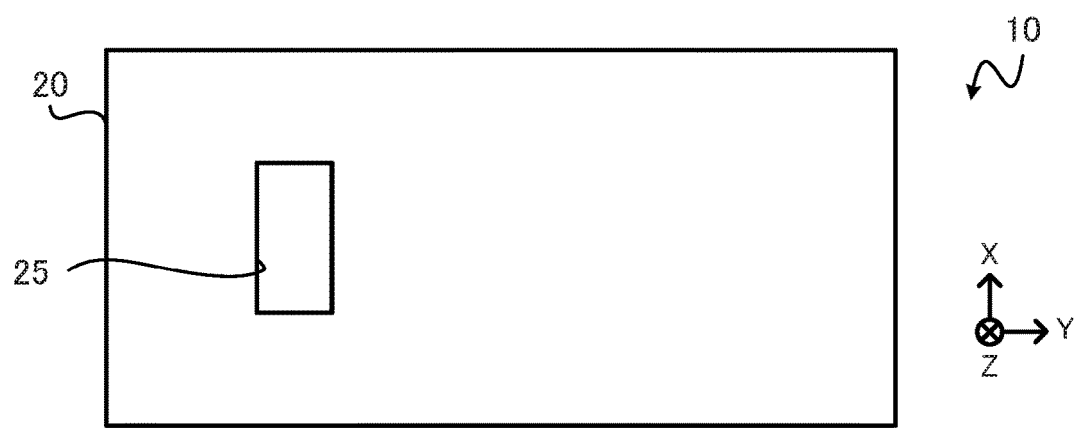
FIG. 5 is a drawing illustrating a bottom surface of the applicator device according to the embodiment of the present disclosure.

An opening 25 is provided in the bottom surface of the housing 20, that is, in the surface facing the application target 50. The applicator 19 applies the ink to the application surface 51 through the opening 25. FIG. 5 schematically illustrates the bottom surface of the housing 20. As illustrated in FIG. 5, the opening 25 is formed in the bottom surface of the housing 20. The opening 25 has a rectangular shape. The size of the opening 25 corresponds to the smallest region in which the applicator 19 applies the ink. The width in the X-direction of the opening 25 is configured to be slightly greater than the width of the nozzles so that all of the nozzles of the ink head 22 are exposed through the opening 25.

The image capturer 17 is fixed at a predetermined position within the housing 20. Specifically, the image capturer 17 is fixed in an upper portion of the housing 20, at a position opposite the opening 25 provided in the bottom surface of the housing 20. That is, the image capturer 17 is fixed at a position directly above the opening 25. As a result of this configuration, the field of view 29 of the image capturer 17 is directed downward, toward the opening 25. The image capturer 17 captures an image of the application surface 51 through the opening 25. As such, the range, on the application surface 51, defined by the opening 25 is the imaging range of the image capturer 17.

As illustrated in FIG. 3, when the applicator 19 is positioned directly below the image capturer 17, the ink cartridge 21 is in the field of view 29 of the image capturer 17 and, as such, the image capturer 17 cannot capture the image of the application surface 51. Therefore, at the time of capturing of the image using the image capturer 17, the applicator 19 is driven by the driver 18 and moved to a position outside the field of view 29 of the image capturer 17.

Figure 6:
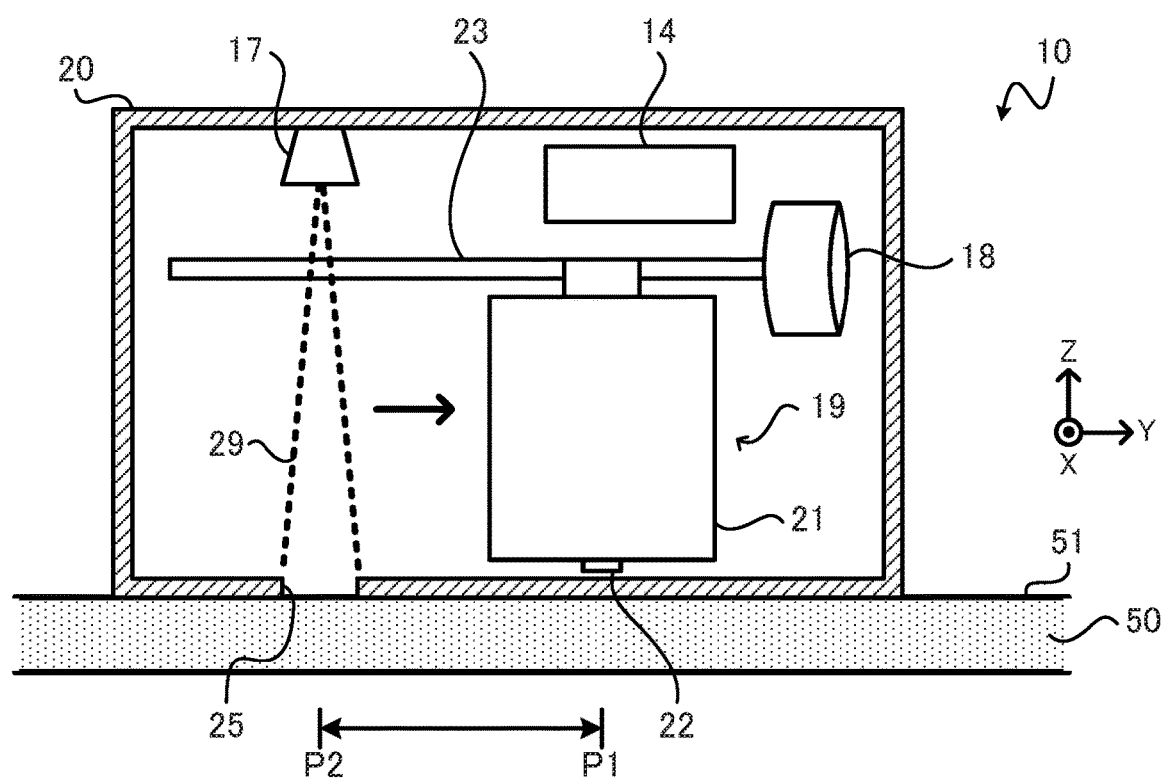
FIG. 6 is a drawing illustrating the applicator device according to the embodiment of the present disclosure, in which the applicator is moved to a retracted position.
Figure 7:
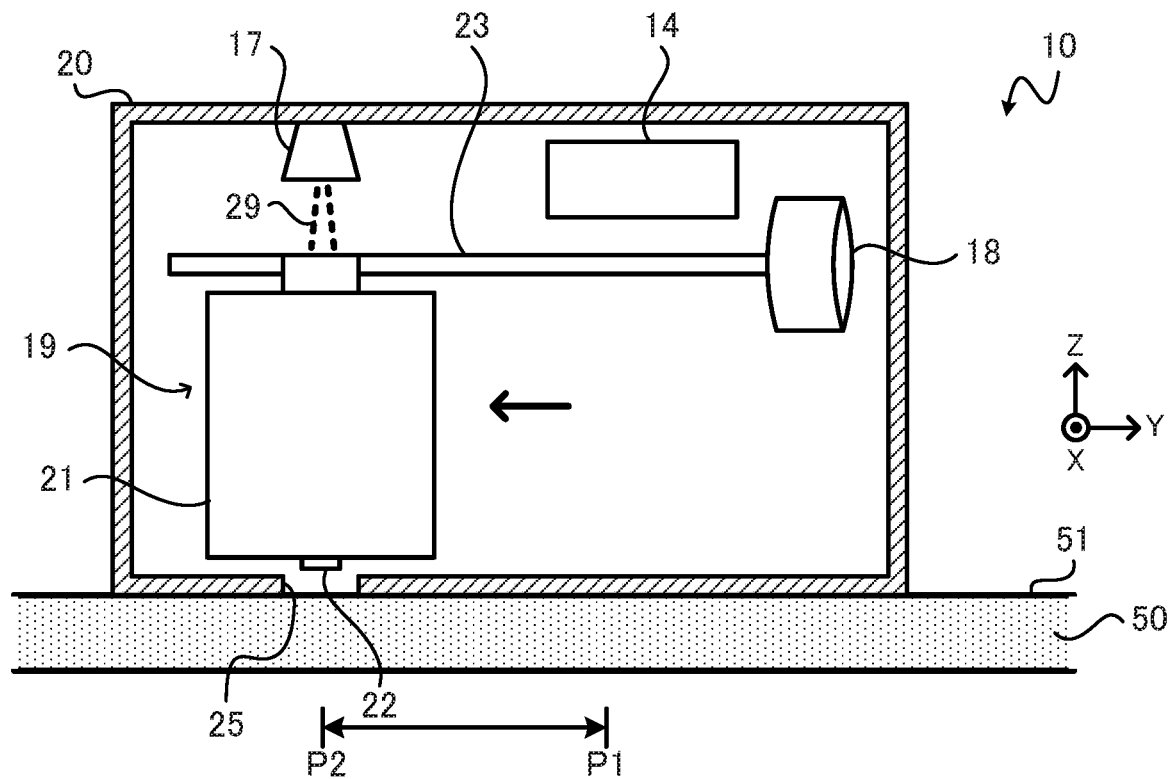
FIG. 7 is a drawing illustrating the applicator device according to the embodiment of the present disclosure, in which the applicator is moved to an application position.

FIGS. 6 and 7 respectively illustrate the applicator device 10 when the applicator 19 is at a retracted position P1 and an application position P2. The retracted position P1 is a first position separated from between the image capturer 17 and the opening 25. When at the retracted position P1, the applicator 19 does not block the field of view 29 at the time of capturing of the image of the application surface 51 by the image capturer 17. As illustrated in FIG. 6, when capturing is being performed by the image capturer 17, the applicator 19 moves to the retracted position P1, which is outside the angle of view of the image capturer 17, so as not to obstruct the capturing of the image of the application surface 51 by the image capturer 17. In contrast, the application position P2 is a second position between the image capturer 17 and the opening 25. When the applicator 19 is at the application position P2, the applicator 19 blocks the field of view 29 of the capturing of the image of the application surface 51 by the image capturer 17. As illustrated in FIG. 7, when ink is being applied to the application surface 51, the applicator 19 moves to the application position P2, which is inside the angle of view of the image capturer 17, such that the ink head 22 is positioned directly above the opening 25.

As illustrated in FIG. 4, two illuminators 27 are provided in the housing 20 near the image capturer 17. The illuminators 27 are provided in the upper portion of the housing 20 and face downward. When the applicator 19 is at the retracted position P1, the illuminators 27 turn ON and emit light toward the opening 25. As a result of this configuration, in the housing 20, where external light does not reach, the illuminators 27 sufficiently illuminate the imaging range of the image capturer 17. The illuminators 27 turn ON at the time of capturing in the housing 20 where external light does not reach. As a result, it is possible to prevent variation in the lighting conditions due to the influence of external light each time capturing is performed. Note that the illuminators 27 turn OFF when the applicator 19 is at the application position P2 because, at this time, it is impossible for the image capturer 17 to image the application surface 51.

When the power of the applicator device 10 is turned OFF, the applicator 19 moves to the initial position, namely the application position P2, and stands by. Moreover, when not in use, the applicator device 10 is stored in a capping stand (not illustrated in the drawings). When the applicator device 10 is stored in the capping stand, the opening 25 and the tip of the ink head 22 are covered by a cap portion of the capping stand. As a result, the ink of the ink head 22 can be prevented from drying.

Figure 8:
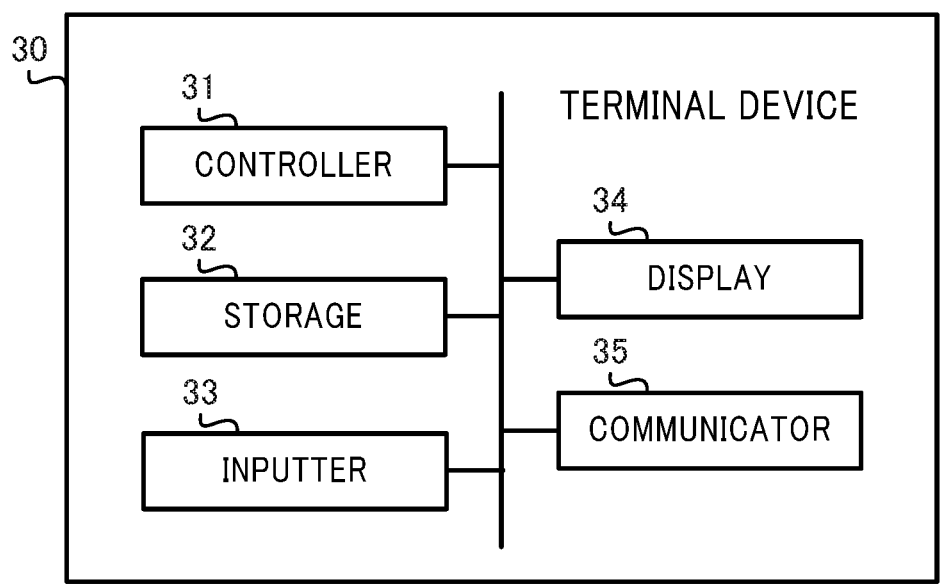
FIG. 8 is a block diagram illustrating the hardware configuration of a terminal device according to the embodiment of the present disclosure.

In the applicator system 1 illustrated in FIG. 1, the terminal device 30 is a terminal device such as a smartphone, a tablet terminal, a personal computer, or the like, and is operated by the user. As illustrated in FIG. 8, the terminal device 30 includes a controller 31, a storage 32, an inputter 33, a display 34, and a communicator 35.

The controller 31 includes a CPU, ROM, and RAM. In one example, the CPU is a microprocessor or the like and is a central processing unit that executes a variety of processing and computation. In the controller 31, the CPU is connected, via a system bus, to each component of the terminal device 30. The CPU reads a control program stored in the ROM, and controls the operations of the entire terminal device 30 while using the RAM as working memory.

The controller 31 includes an image processing processor such as a digital signal processor (DSP) or a graphics processing unit (GPU), and buffer memory that temporarily saves images to be processed. The controller 31 uses the image processing processor and a well-known image processing method to process captured images obtained by the capturing by the image capturer 17.

The storage 32 is nonvolatile memory such as flash memory or a hard disk. The storage 32 stores an operating system (OS), application programs, and other programs and data used by the controller 31 to perform the various processes. Moreover, the storage 32 stores data generated or acquired as a result of the controller 31 performing the various processes.

The inputter 33 includes an input device such as an input key, a button, a switch, a touch pad, and a touch panel. The inputter 33 receives operation commands input by the user, and sends the received operation commands to the controller 31.

The display 34 is a display device such as a liquid crystal display or an organic electro luminescence (EL) display. The display 34 is driven by a display drive circuit (not illustrated in the drawings), and displays various images according to the situation. Note that a configuration is possible in which the display 34 is disposed overlapping the inputter 33. In such a case, the display 34 and the inputter 33 form a so-called touch panel (touch screen). The display 34 functions as the display means.

The communicator 35 includes an interface for communicating, under the control of the controller 31, with external devices via an antenna. In one example, the communicator 35 communicates with the applicator device 10 via a USB, a wireless LAN, Bluetooth (registered trademark), or the like. The communicator 35 can be connected to a wide area network such as the internet via wired or wireless communication.

Figure 9:
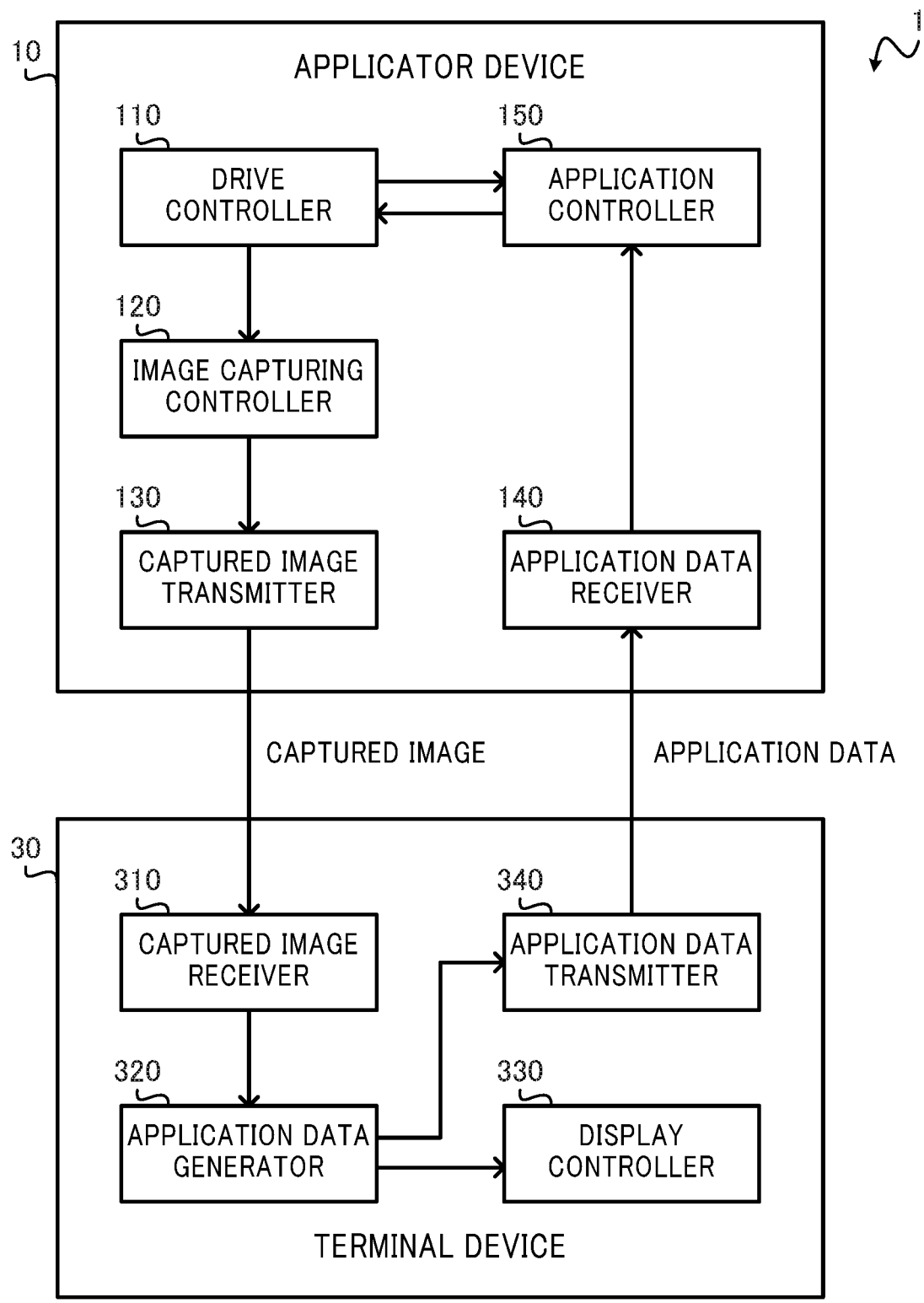
FIG. 9 is a block diagram illustrating the functional configuration of an applicator system according to the embodiment of the present disclosure.

Next, the functional configuration of the applicator system 1 is described while referencing FIG. 9. As illustrated in FIG. 9, the applicator device 10 includes, as functional components, a drive controller 110, an image capturing controller 120, a captured image transmitter 130, an application data receiver 140, and an application controller 150. In the controller 11, the CPU reads the program stored in the ROM out to the RAM and executes that program, thereby functioning as the various components described above.

The drive controller 110 controls the driver 18, thereby causing the applicator 19 to move between the retracted position P1 illustrated in FIG. 6 and the application position P2 illustrated in FIG. 7. Specifically, when the application surface 51 is to be imaged by the image capturer 17, the drive controller 110 causes the applicator 19 to move to the retracted position P1 illustrated in FIG. 6. Meanwhile, when the applicator 19 is to apply the ink to the application surface 51, the drive controller 110 causes the applicator 19 to move to the application position P2 illustrated in FIG. 7. The drive controller 110 is realized by cooperation between the controller 11 and the driver 18.

The image capturing controller 120 controls the capturing performed by the image capturer 17. Specifically, the image capturing controller 120 causes the illuminators 27 to turn ON when the applicator 19 is at the retracted position P1. Moreover, the image capturing controller 120 causes the image capturer 17 to image the range of the application surface 51 that is visible through the opening 25. Thus, the image capturing controller 120 acquires a captured image in which the distribution of brightness on the application surface 51 is depicted. The image capturing controller 120 is realized by cooperation between the controller 11 and the image capturer 17.

Figure 10:
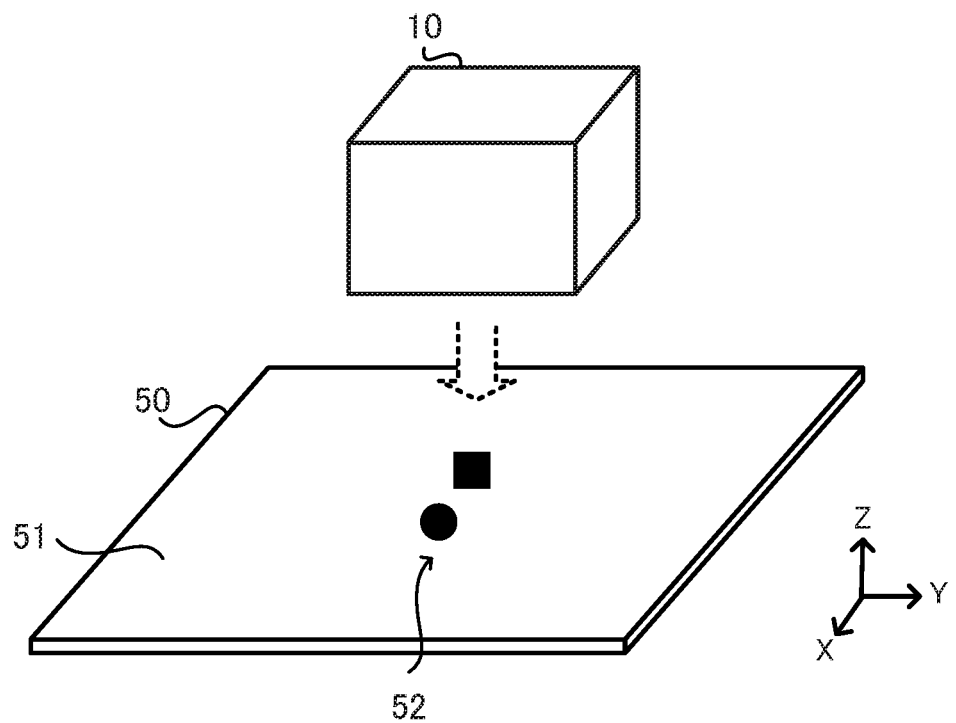
FIG. 10 is a drawing illustrating an example in which the applicator device according to the embodiment of the present disclosure is set above an application surface.

As illustrated in FIG. 10, in one example, there are low brightness regions 52, which are regions, on the application surface 51 of the application target 50, where the brightness is lower than that of the surrounding area (the black regions in FIG. 10). In cases in which the user desires to apply ink on the low brightness regions 52, the applicator device 10 is set above the application surface 51 as illustrated in FIG. 10. At this time, the user adjusts the position of the applicator device 10 such that the opening 25 of the applicator device 10 matches the positions of the low brightness regions 52.

Figure 11:
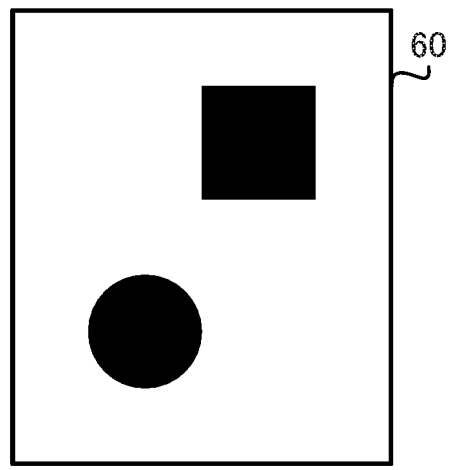
FIG. 11 is a drawing illustrating an example of a captured image according to the embodiment of the present disclosure.

While the applicator device 10 is set above the application surface 51 in such a manner and, also, the applicator 19 has been moved to the retracted position P1 by the drive controller 110, the image capturing controller 120 causes the image capturer 17 to image the low brightness regions 52 through the opening 25. As a result, for example, as illustrated in FIG. 11, the image capturing controller 120 acquires a captured image 60 that depicts the distribution of brightness in the low brightness region 52 and the surrounding area thereof on the application surface 51.

The captured image transmitter 130 transmits the captured image 60 of the application surface 51, obtained by the capturing by the image capturer 17, to the terminal device 30. Specifically, the captured image transmitter 130 communicates with the terminal device 30 via the communicator 15, and transmits an image of the application surface 51, captured by the image capturer 17, to the terminal device 30. The captured image transmitter 130 is realized by cooperation between the controller 11 and the communicator 15. The captured image transmitter 130 functions as the captured image transmitting means.

Specifically, the captured image transmitter 130 repeatedly transmits, on a predetermined cycle, a captured image 60 obtained by the image capturer 17 to the terminal device 30. As a result, even when, for example, the applicator device 10 is moved, thereby changing the position to be imaged by the image capturer 17, the captured image transmitter 130 transmits as necessary to the terminal device 30 a captured image 60 in which the brightness distribution at the new position is depicted.

As illustrated in FIG. 9, the terminal device 30 includes, as functional components, a captured image receiver 310, an application data generator 320, a display controller 330, and an application data transmitter 340. In the controller 31, the CPU reads the program stored in the ROM out to the RAM and executes that program, thereby functioning as the various components described above.

The captured image receiver 310 receives the captured image 60 of the application surface 51 transmitted from the applicator device 10. Specifically, the captured image receiver 310 communicates with the applicator device 10 via the communicator 35 and, when a captured image 60 is transmitted from the applicator device 10, receives the captured image 60 that is transmitted. The captured image receiver 310 is realized by cooperation between the controller 31 and the communicator 35. The captured image receiver 310 functions as the captured image receiving means.

The application data generator 320 generates, based on the captured image 60 received by the captured image receiver 310, application data that indicates the positions and the amounts of ink to be applied to the application surface 51. Specifically, the application data generator 320 analyzes the brightness at each position in the captured image 60. Moreover, the application data generator 320 identifies portions in the captured image 60 where the brightness is lower than a threshold (that is, relatively dark portions) and portions in the captured image 60 where the brightness is higher than the threshold (that is, relatively light portions).

Here, the portions where the brightness is lower than the threshold correspond specifically to the low brightness regions 52 in the captured image 60. The portions where the brightness is higher than the threshold correspond specifically to background portions, which are the portions in the captured image 60 other than the low brightness regions 52. The application data generator 320 determines the application positions and the application amounts of the ink such that the ink is applied to the portions where the brightness is lower than the threshold and/or the portions where the brightness is higher than the threshold.

The user can change the settings for whether to apply the ink to the portions where the brightness is higher or lower than the threshold and the settings for the application amounts of the ink by operating the user interface 13. In one example (1), the ink is applied to the portions where the brightness is lower than the threshold, thereby enabling use in applications such as correcting written mistakes and making dirt, stains, or the like less conspicuous when dirt, stains, or the like are present on the application surface 51. In another example (2), the ink is applied to the portions where the brightness is higher than the threshold, thereby enabling use in applications such as printing desired images on the background portions. In the following, an example is described of processing in which ink is applied to the portions of the application surface 51 where the brightness is lower than the threshold, that is, to the low brightness regions 52, thereby making the low brightness regions 52 less conspicuous. Here, the ink that is applied has a color that has a higher brightness than that of the low brightness regions 52.

Figure 12:
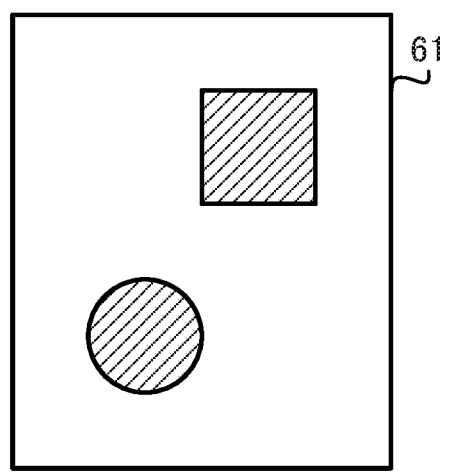
FIG. 12 is a drawing illustrating an example of application data according to the embodiment of the present disclosure.

Specifically, the application data generator 320 determines, based on the distribution of brightness in the captured image 60 illustrated in FIG. 11, the application positions of the ink such that the ink is applied to the portions where the brightness is lower than the threshold. Additionally. the application data generator 320 determines the application amounts of the ink such that the amount of ink that is applied increases as the brightness of the portion decreases. Moreover, as illustrated in FIG. 12, the application data generator 320 generates application data 61 that indicates the determined application positions and the application amounts. The application data 61 is image data that indicates the pattern of the ink to be applied to the application surface 51. Specifically, as illustrated in FIG. 12, the application data 61 is data that indicates that ink having color that has a higher brightness (indicated by the diagonal lines in FIG. 12) than the low brightness regions 52 is to be applied to the low brightness regions 52 in the captured image 60.

Thus, the application data generator 320 determines, based on the distribution of brightness of the application surface 51 captured by the image capturer 17, the pattern of the ink to be applied to the application surface 51, and generates application data 61 that indicates the determined pattern. The application data generator 320 is realized by the controller 31. The application data generator 320 functions as the application data generating means.

Returning to FIG. 9, the display controller 330 causes the display 34 to display the captured image 60 of the application surface 51 that is received by the captured image receiver 310. Additionally, the display controller 330 also causes the display 34 to display the application data 61, generated by the application data generator 320, together with the captured image 60. The display controller 330 is realized by cooperation between the controller 31 and the display 34.

Figure 13:
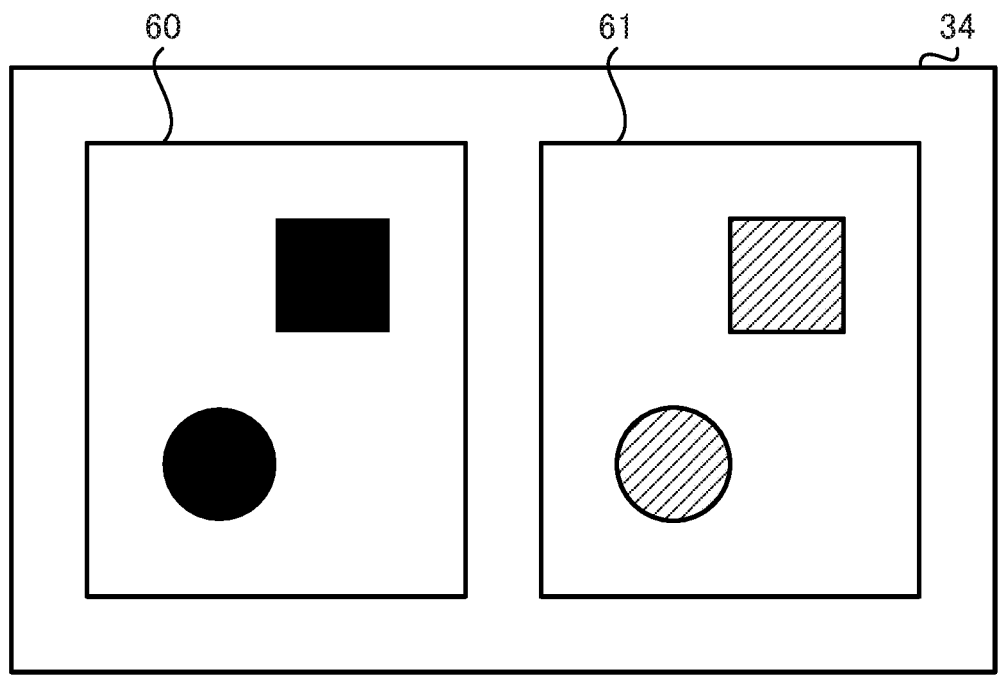
FIG. 13 is a drawing illustrating an example of the captured image and the application data displayed on the terminal device according to the embodiment of the present disclosure.

FIG. 13 illustrates an example of a display screen displayed on the display 34. As illustrated in FIG. 13, the display controller 330 causes the captured image 60 and the application data 61 to be displayed side by side in a single display screen of the display 34. Since the captured image 60 is displayed in this manner, the user can easily recognize whether the applicator device 10 is correctly set at the desired position above the application surface 51. Moreover, since the application data 61 is displayed, the user can easily confirm how the application surface 51 will look in a case in which the ink is applied using the current settings of the applicator device 10.

More specifically, the display controller 330 causes the display 34 to display a new captured image 60 each time a new captured image 60 is transmitted from the applicator device 10. Moreover, each time a new captured image 60 is transmitted from the applicator device 10, the application data generator 320 generates new application data 61 based on the new captured image 60 and the display controller 330 causes the display 34 to display the new application data 61 that is generated. Thus, the captured image 60 and the application data 61 are updated to the latest image at all times and displayed. As a result, by viewing the display 34, the user can move the applicator device 10 to various positions above the application surface 51 and flexibly adjust the position where the ink is to be applied.

When, as a result of confirming the display 34, the user determines to start applying the ink, the user inputs an application start command via the user interface 13 of the applicator device 10 or the inputter 33 of the terminal device 30. When the application start command is input via the user interface 13 of the applicator device 10, the command that is input is sent to the terminal device 30 via the communicator 15.

Returning to FIG. 9, when the application start command is input by the user, the application data transmitter 340 transmits, to the applicator device 10, the application data 61 generated by the application data generator 320. Specifically, the application data transmitter 340 communicates with the applicator device 10 via the communicator 35, and transmits, to the applicator device 10, the latest application data 61 at the time when the application start command was input from among the various application data 61 generated by the application data generator 320. The application data transmitter 340 is realized by cooperation between the controller 31 and the communicator 35. The application data transmitter 340 functions as the application data transmitting means.

The application data receiver 140 of the applicator device 10 receives the application data transmitted from the terminal device 30. Specifically, the application data receiver 140 communicates with the terminal device 30 via the communicator 15 and, when the application data 61 is transmitted from the terminal device 30, receives the transmitted application data 61. The application data receiver 140 is realized by cooperation between the controller 11 and the communicator 15. The application data receiver 140 functions as the application data receiving means.

When the application data 61 transmitted from the terminal device 30 is received by the application data receiver 140, the drive controller 110 drives the driver 18, thereby causing the applicator 19 to move from the retracted position P1, which is outside the angle of view of the image capturer 17, to the application position P2, which is under the image capturer 17, as illustrated in FIG. 7. Then, the application controller 150 controls the applicator 19, thereby causing the ink to be applied from the ink head 22 in accordance with the application data 61 received by the application data receiver 140.

Under the control of the application controller 150, the applicator applies the ink to the application surface 51 when the applicator 19 is at the application position P2. Here, the applicator 19 applies the ink based on the captured image 60 of the application surface 51 obtained by the image capturer 17 when the applicator 19 is at the retracted position P1. Specifically, the application controller 150 outputs, to the applicator 19, the content of the application data 61 received by the application data receiver 140. Then, the application controller 150 controls the energizing dots of the applicator 19, thereby causing the ink to be discharged from the ink head 22. At this time, the application controller 150 drives the driver 18, thereby causing the applicator 19, located at the application position P2, to gradually move and, moreover, when the nozzles of the ink head 22 reach each application position indicated by the application data 61, to discharge, from the nozzles, an amount of ink indicated in the application data 61.

Thus, the applicator 19 applies the ink through the opening 25 onto the application surface 51 in the pattern specified by the application data 61. As a result, the ink is applied in a pattern based on the distribution of brightness depicted in the captured image 60, in the range of the application surface 51 captured by the image capturer 17.

Figure 14:
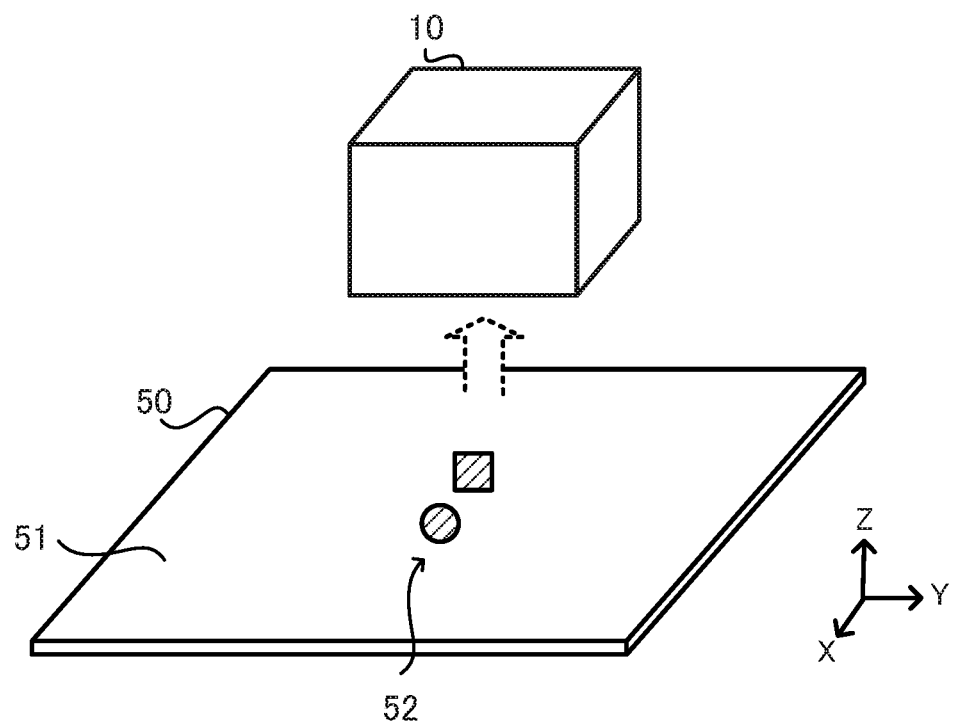
FIG. 14 is a drawing illustrating an example in which ink is applied to the application surface in the embodiment of the present disclosure.

Finally, when the specified amount of ink is applied on the application surface 51 at each position specified by the application data 61, the application of the ink to the application surface 51 is ended. As a result, for example, as illustrated in FIG. 14, the ink is applied in the low brightness regions 52 on the application surface 51. The application controller 150 is realized by cooperation between the controller 11, the applicator 19, and the driver 18.

Note that, in cases in which the amount of ink specified in the application data 61 cannot be applied in a single scan, the application controller 150 may apply the ink by repeatedly moving the applicator 19 back and forth above the application range, namely the opening 25. In other words, the application controller 150 may apply the ink by scanning the ink head 22 above the opening 25 a plurality of times until the amount of ink applied on the application surface 51 at each application position reaches the application amount specified in the application data 61.

Next, the flow of the processing executed in the applicator system 1 configured as described above is described while referencing FIG. 15.

Figure 15:
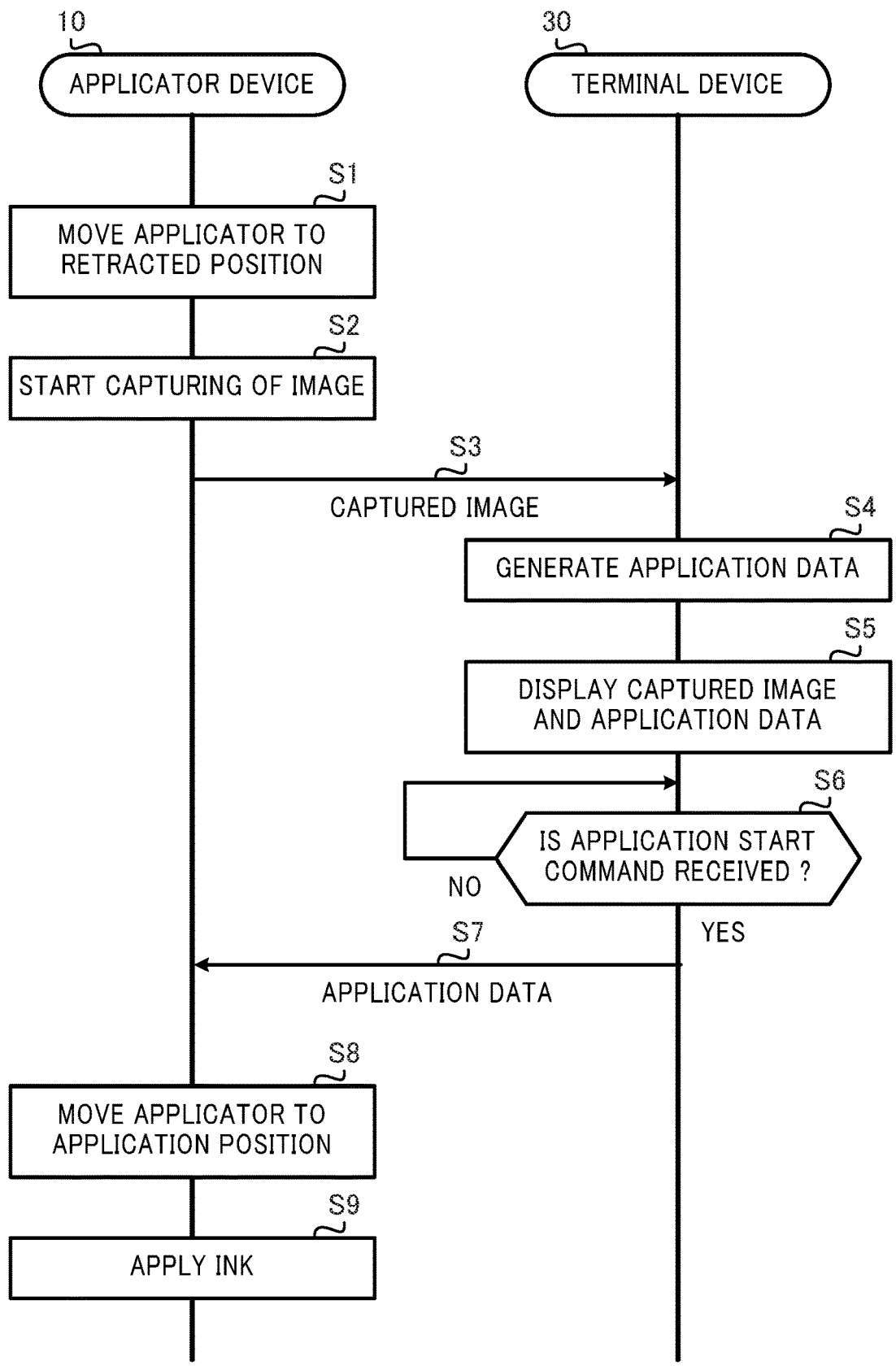
FIG. 15 is a sequence diagram illustrating the flow of processing executed by the applicator system according to the embodiment of the present disclosure.

FIG. 15 illustrates the flow of processing executed by the applicator device 10 and the terminal device 30. As illustrated in FIG. 10, the user sets the applicator device 10 above the application surface 51 by matching the opening 25 with the location, on the application surface 51 of the application target 50, to which the ink is to be applied. Then, the user turns ON the power of the applicator device 10 and, when the applicator device 10 is in a normal state capable of applying the ink, the processing illustrated in FIG. 15 is started.

When the processing illustrated in FIG. 15 is started, in the applicator device 10, the controller 11 functions as the drive controller 110 and causes the applicator 19 to move to the retracted position P1 (step S1). In an initial state, the applicator 19 is positioned directly under the image capturer 17, that is, the applicator 19 is positioned at the application position P2. When the power of the applicator device 10 is turned ON, as illustrated in FIG. 6, the controller 11 drives the driver 18, thereby causing the applicator 19 to move from the application position P2 to the retracted position P1. As a result, the image capturer 17 can image the application surface 51.

When the applicator 19 is caused to move to the retracted position P1, the controller 11 functions as the image capturing controller 120 and starts the capturing by the image capturer 17 (step S2). Specifically, the controller 11 causes the illuminators 27 to turn ON, and starts the capturing, through the opening 25, of the image of the application surface 51.

When the capturing starts, the controller 11 functions as the captured image transmitter 130 and transmits a captured image to the terminal device 30 (step S3). When the captured image is transmitted from the applicator device 10, the controller 31 of the terminal device 30 functions as the captured image receiver 310 and receives the transmitted captured image.

When the captured image is received, the controller 31 functions as the application data generator 320 and generates application data based on the received captured image (step S4). Specifically, the controller 31 determines, based on the distribution of brightness of the application surface 51 depicted in the received captured image, the positions and amounts of ink to be applied to the application surface 51, and generates application data that indicates the determined positions and amounts. For example, when ink is to be applied to the portions, in the captured image 60 illustrated in FIG. 11, where the brightness is lower than the threshold, the controller 31 generates the application data 61 illustrated in FIG. 12.

When the application data is generated, the controller 31 functions as the display controller 330 and displays the captured image and the application data on the display 34 (step S5). In one example, as illustrated in FIG. 13, the controller 31 causes the captured image 60 and the application data 61 to be displayed side by side in a single display screen.

When the captured image and the application data are displayed, the controller 31 determines whether an application start command has been received (step S6). Specifically, the controller 31 determines whether a command to start the application of the ink has been input, via the user interface 13 or the inputter 33, by a user that has viewed the display 34. When an application start command has not been received (step S6; NO), the controller 31 stops the processing at step S6 and stands by until an application start command is received.

When an application start command has been received (step S6; YES), the controller 31 functions as the application data transmitter 340 and transmits the application data generated in step S4 to the applicator device 10 (step S7). When the application data is transmitted from the terminal device 30, the controller 11 of the applicator device 10 functions as the application data receiver 140 and receives the transmitted application data.

When the application data is received, the controller 11 functions as the drive controller 110 and causes the applicator 19 to move to the application position P2 (step S8). Specifically, as illustrated in FIG. 7, the controller 11 drives the driver 18, thereby causing the applicator 19, which was moved to the retracted position P1 in step S1, to move to the application position P2. At this time, since the image capturer 17 is no longer capturing the image of the application surface 51, the controller 11 turns the illuminators 27 OFF. As a result, the ink can be applied to the application surface 51.

When the applicator 19 is caused to move to the application position P2, the controller 11 functions as the application controller 150 and applies the ink (step S9). Specifically, the controller 11 drives the driver 18, thereby causing the applicator 19 to gradually move above the opening 25 that is the application range and, at the same time, discharge the ink from the ink head 22 in accordance with the application data received from the terminal device 30. As a result, as illustrated in FIG. 14 for example, the ink is applied in the low brightness regions 52 on the application surface 51.

As described above, the applicator device 10 according to the present embodiment is a device that applies ink to the application surface 51 based on an image of the application surface 51 captured by the image capturer 17. In the applicator device 10, the applicator 19 is caused to move and, when at the application position P2, the applicator 19 applies the ink based on an image captured by the image capturer 17 when the applicator 19 was at the retracted position P1. Thus, the applicator 19 moves to positions captured by the image capturer 17 and applies the ink. Therefore, ink can be applied without moving the applicator device 10 after the application surface 51 has been imaged by the image capturer 17. As a result, ink can be applied at correct positions on the application surface 51 using a comparatively simple configuration in which the applicator 19 is caused to move within the housing 20. Moreover, ink can be simply applied, regardless of the level of operating experience of the user.

Modified Examples

Embodiments of the present disclosure are described above, but these embodiments are merely examples and do not limit the scope of application of the present disclosure. That is, various applications of the embodiments of the present disclosure are possible, and all embodiments are included in the scope of the present disclosure.

For example, in the embodiments described above, the applicator device 10 applies the ink to portions of the application surface 51 where the brightness is higher or lower than a threshold. However, in the present disclosure, the applicator device 10 may apply the ink in accordance with any criteria. For example, when characters are drawn on the application surface 51, a configuration is possible in which the applicator device 10 identifies a character portion from the distribution of brightness, and writes, near the character portion, kana characters that correspond to the characters. Alternatively, a configuration is possible in which the applicator device 10 draws a border by applying ink to the boundary between the character portion and the background portion In the embodiments described above, the terminal device 30, which is a device separate from the applicator device 10, is provided with the functions of the application data generator 320. However, in the present disclosure, a configuration is possible in which the applicator device 10 itself is provided with the functions of the application data generator 320. Specifically, a configuration is possible in which the applicator device 10 is provided with all of the functions, namely, the function of acquiring the captured image 60 of the application surface 51 by the image capturer 17, the function of generating the application data 61 based on the acquired captured image 60, and the function of applying ink in accordance with the generated application data 61. In such a case, the applicator device 10 need not be provided with the functions of the captured image transmitter 130 and the functions of the application data receiver 140, and the terminal device 30 need not be provided with the functions of the captured image receiver 310 and the functions of the application data transmitter 340.

In the embodiments described above, as illustrated in FIG. 13, the display controller 330 displays the captured image 60 and the application data 61 side by side on the display 34. However, in the present disclosure, a configuration is possible in which the application data 61 is overlaid on the captured image 60 and displayed on the display 34. In other words, the display controller 330 may overlay an application pattern, indicated by the application data 61, on the captured image 60 and display the result on the display 34. Specifically, in such a case, the display controller 330 overlays and displays an image of a state in which the ink is applied to the portions in the captured image 60 to which the ink is to be applied, that is, to the low brightness regions 52. Additionally, the display controller 330 displays the portions of the captured image 60 where the ink is not to be applied, that is, the background portions other than the low brightness regions 52, in an unmodified state in which nothing is overlaid on the captured image 60. Since the application data 61 is overlaid on the captured image 60 and displayed, the user can confirm how the application surface 51 will look in a case in which the ink is applied to the region imaged by the image capturer 17. Moreover, in this case, a state that is more similar to the actual state when the ink is applied will be depicted.

In the embodiments described above, the applicator 19 discharges the ink from the ink head 22 by a thermal method. However, in the present disclosure, the method whereby the applicator 19 discharges the ink is not limited and a different method may be used. For example, a configuration is possible in which the applicator 19 discharges the ink using a Piezo method. In such a method, piezo elements are used to print the image to be printed on the application target 50. Moreover, the method whereby the applicator 19 applies the ink onto the application target 50 is not limited to an ink jet method and a different method, such as a thermal transfer method, may be used. Additionally, the shape of the applicator device 10 is not limited to the square columnar shape illustrated in FIG. 1, and any shape may be used. Furthermore, the image capturer 17 is not limited to a camera, and, for example, it is possible to use an optical sensor, which is capable of detecting the distribution of brightness, to acquire a captured image that depicts the distribution of brightness of the application surface 51.

In the embodiments described above, in the controllers 11 and 31, the CPU executes the program stored in the ROM, thereby functioning as the various components illustrated in FIG. 9. However, in the present disclosure, the controllers 11 and 31 may include, for example, an Application Specific Integrated Circuit (ASIC), a Field-Programmable Gate Array (FPGA), various control circuitry, or other dedicated hardware instead of the CPU, and this dedicated hardware may function as the various components illustrated in FIG. 9. In this case, the functions of each of the components may be realized by individual pieces of hardware, or the functions of each of the components may be collectively realized by a single piece of hardware. Additionally, the functions of each of the components may be realized in part by dedicated hardware and in part by software or firmware.

It is possible to provide an applicator device and a terminal device provided in advance with the configurations for realizing the functions according to the present disclosure, but it is also possible to apply a program to cause an existing information processing device or the like to function as the applicator device and the terminal device according to the present disclosure. That is, a configuration is possible in which a CPU or the like that controls an existing information processing apparatus or the like is used to execute a program for realizing the various functional components of the applicator device 10 and the terminal device 30 described in the foregoing embodiments, thereby causing the existing information processing device to function as the applicator device and the terminal device according to the present disclosure.

Any method may be used to apply the program. For example, the program can be applied by storing the program on a non-transitory computer-readable recording medium such as a flexible disc, a compact disc (CD) ROM, a digital versatile disc (DVD) ROM, and a memory card. Furthermore, the program can be superimposed on a carrier wave and applied via a communication medium such as the internet. For example, the program may be posted to and distributed via a bulletin board system (BBS) on a communication network. Moreover, a configuration is possible in which the processing described above is executed by starting the program and, under the control of the operating system (OS), executing the program in the same manner as other applications/programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An applicator device comprising:
   a camera that captures an image of an application surface of an application target;
   a print head that applies a material to the application surface; and
   a driver that causes the print head to move between a first position where the print head does not block a field of view of the capturing, by the camera, of the image of the application surface and a second position where the print head blocks the field of view of the capturing, by the camera, of the image of the application surface, wherein
   the print head applies the material to the application surface when the print head is at the second position, based on the image of the application surface captured by the camera when the print head is at the first position.

2. The applicator device according to claim 1, further comprising:
   a housing in which the camera and the print head are housed, wherein
   the camera is fixed to a predetermined position in the housing and captures the image of the application surface through an opening provided in the housing, and
   the print head is caused by the driver to move between the first position and the second position in the housing and applies the material to the application surface through the opening when the print head is at the second position.

3. The applicator device according to claim 2, further comprising an illuminator that emits light toward the opening when the print head is at the first position.

4. The applicator device according to claim 1, wherein the print head applies the material to the application surface based on a distribution of brightness on the application surface depicted in the captured image obtained by the camera.

5. The applicator device according to claim 4, wherein the print head identifies, based on the distribution of brightness depicted in the captured image obtained by the camera, a portion of the application surface where the brightness is higher than a threshold and a portion of the application surface where the brightness is lower than the threshold, and applies the material to at least one of the portion where the brightness of the application surface is higher than the threshold or the portion where the brightness of the application surface is lower than the threshold.

6. An applicator system comprising:
   the applicator device according to claim 1; and
   a terminal device, wherein
   the applicator device further includes
      a captured image transmitter that transmits the captured image obtained by the camera to the terminal device, and
   the terminal device includes
      a captured image receiver that receives the captured image transmitted from the applicator device, and
      a display that displays the captured image received by the captured image receiver.

7. The application system according to claim 6, wherein:
   the terminal device further includes
      an application data generator that generates, based on the captured image received by the captured image receiver, application data that indicates positions and amounts of the material to be applied to the application surface, and
      an application data transmitter that transmits the application data generated by the application data generator to the applicator device,
   the applicator device further includes
      an application data receiver that receives the application data transmitted from the terminal device, and
   the print head applies the material to the application surface in accordance with the application data received by the application data receiver.

8. The applicator system according to claim 7, wherein in the terminal device, the display displays the captured image received by the captured image receiver together with the application data generated by the application data generator.

9. The applicator system according to claim 7, wherein in the terminal device, the display displays the application data generated by the application data generator overlaid on the captured image received by the captured image receiver.

10. An application method for applying a material by an applicator device including a camera that captures an image of an application surface of an application target, and a print head that applies a material to the application surface, the application method comprising:
    moving the print head between a first position where the print head does not block a field of view of the capturing, by the camera, of the image of the application surface and a second position where the print head blocks the field of view of the capturing, by the camera, of the image of the application surface; and
    applying the material to the application surface when the print head is at the second position, based on the captured image of the application surface captured by the camera when the print head is at the first position.

11. The application method according to claim 10, wherein:
    the applicator device further includes a housing in which the camera and the print head are housed,
    the camera is fixed to a predetermined position in the housing and captures the image of the application surface through an opening provided in the housing,
    the moving of the print head includes moving the print head between the first position and the second position in the housing, and
    the applying of the material includes applying the material to the application surface through the opening when the print head is at the second position.

12. The application method according to claim 10, wherein, the applying of the material includes applying the material to the application surface based on a distribution of brightness of the application surface, depicted in the captured image obtained by the camera.

13. The application method according to claim 12, wherein the applying of the material includes identifying, based on the distribution of brightness depicted in the captured image obtained by the camera, a portion where the brightness is higher than a threshold and a portion where the brightness is lower than the threshold, and applying the material to at least one of the portion where the brightness of the application surface is higher than the threshold or the portion where the brightness of the application surface is lower than the threshold.

14. A non-transitory computer-readable recording medium that stores a program for execution in a computer of an applicator device comprising a camera that captures an image of an application surface of an application target and a print head that applies a material to the application surface, the program causing the computer to:
move the print head between a first position where the print head does not block a field of view of the capturing, by the camera, of the image of the application surface and a second position where the print head blocks the field of view of the capturing, by the camera, of the application surface; and
apply the material to the application surface when the print head is at the second position, based on the image of the application surface captured by the camera when the print head is at the first position.

15. The non-transitory computer-readable recording medium according to claim 14, wherein:
the applicator device further includes a housing in which the camera and the print head are housed,
the camera is fixed to a predetermined position in the housing and captures the image of the application surface through an opening provided in the housing, and
the program causes the computer to
move the print head between the first position and the second position in the housing, and
apply the material to the application surface, through the opening when the print head is at the second position.

16. The non-transitory computer-readable recording medium according to claim 15, wherein the program causes the computer to apply the material to the application surface based on a distribution of brightness of the application surface, depicted in the captured image obtained by the camera.

17. The non-transitory computer-readable recording medium according to claim 16, wherein the program causes the computer to identify, based on the distribution of brightness depicted in the captured image obtained by the camera, a portion of the application surface where the brightness is higher than a threshold and a portion of the application surface where the brightness is lower than the threshold, and apply the material to at least one of the portion where the brightness of the application surface is higher than the threshold or the portion where the brightness of the application surface is lower than the threshold.

* * * * *

UNITED STATES PATENT AND TRADEMARK OFFICE
CERTIFICATE OF CORRECTION

| | | |
|---|---|---|
| PATENT NO. | : 10,839,273 B2 | Page 1 of 1 |
| APPLICATION NO. | : 16/588020 | |
| DATED | : November 17, 2020 | |
| INVENTOR(S) | : Fumihiro Osakabe | |

It is certified that error appears in the above-identified patent and that said Letters Patent is hereby corrected as shown below:

In the Claims

Column 16, Line 13 (Claim 7, Line 1), delete "application" and insert --applicator--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*